United States Patent [19]
Kim et al.

[11] Patent Number: 5,978,377
[45] Date of Patent: Nov. 2, 1999

[54] STM-BASED ATM CELL PHYSICAL LAYER PROCESSING CIRCUIT

[75] Inventors: Chan Kim; Yeong Ho Park; Doo Sub Eom; Jae Keun Kim, all of Daejon-Shi, Rep. of Korea

[73] Assignee: Electronics and Telecommunications Research Institute, Daejeon-Shi, Rep. of Korea

[21] Appl. No.: 08/909,704

[22] Filed: Aug. 8, 1997

[30] Foreign Application Priority Data

Aug. 9, 1996 [KR] Rep. of Korea ............ 96-33173

[51] Int. Cl.⁶ .................... H04L 12/28; H04L 12/56
[52] U.S. Cl. ................... 370/397; 370/395; 370/476
[58] Field of Search .................... 370/397, 395, 370/399, 409, 412, 413, 415, 417, 307, 392, 438, 469, 471, 472, 474, 476, 905, 365, 366, 352, 389, 467

[56] References Cited

FOREIGN PATENT DOCUMENTS

0677976 A2  10/1995  European Pat. Off. ....... H04Q 11/04

*Primary Examiner*—Dang Ton
*Assistant Examiner*—Phirin Sam
*Attorney, Agent, or Firm*—Cohen, Pontani, Lieberman & Pavane

[57] ABSTRACT

The present invention discloses a processing circuit for STM-based ATM (Asynchronous Transfer Mode) cell physical layer.

In the present invention are disclosed a general circuit structure having a multiplex, demultiplex unit between a byte processing unit and a parallel processing unit, a real-time transform method between 16 bit UTOPIA format and a standard ATM cell format in a ATM cell processing unit, and a control circuit which is normally in 9×270 mode and drives all the circuit in 9×30 mode in a special test mode.

9 Claims, 9 Drawing Sheets

STM-BASED ATM CELL PHYSICAL LAYER PROCESSING CIRCUIT

FIELD OF THE INVENTION

The present invention relates to a function processing integrated circuit in the physical layer for transmitting and receiving Asynchronous Transfer Mode (called "ATM" thereinafter) cells with a STM4-4c or STS-12c frame having a rate of 622 Mbps based I.432 of ITU-T and G.70x or ATM-Forum standard.

BACKGROUND OF THE INVENTION

The Synchronous Digital Hierarchy(called "SDH" thereinafter) of ITU-T relates to a transfer mode in a synchronous transfer network and has a Synchronous Transfer Module 1 (called "STM1" thereinafter) having a format of 9×270 as a basic transfer unit. As such kind of transfer frame is transmitted 8000 frames every second, STM1 has a transfer rate of 155.52 Mbps. The STM1 has a Section Overhead(called "SOH" thereinafter, SOH=RSOH+ MSOH) for operation and management onto a transfer line within its frame, and may contain one Virtual Container 4 (called "VC4" thereinafter) having a format of 9×261 in the unit except for the SOH or three Virtual Containers 3 (called "VC3" thereinafter) having a format of 9×90. These Virtual Containers may begin at a given position of payload portion on a frame and represent the beginning position of VC on the frame as one pointer of overhead on the frame. The pointer indicates the beginning position of VC as the offset from a pointer byte, and the pointer value may vary based on the processing delay at a transfer apparatus and the difference between the clock rates when one VC passes through various transfer apparatus. Though there exist three pointers for three VC3 in STM1 frame, the first pointer is used when only one VC4 is conveyed and the other two are Concatenation Indication(called "CI" thereinafter).

"Concatenation" means that any VC is concatenated to a forehand VC to be a single VC having a larger capacity. This concatenated VC is processed as one unit until it is terminated without being divided in the interim. The first row at the VC4 having a format of 9×261 is used to transmit a Path Overhead (called "POH" thereinafter) which is used for Operation and Maintenance (called "OAM" thereinafter) associated with a convey of VC4. The remaining 9×260 portions represent the portions for conveying real data and are called a Container 4 (called "C4" thereinafter). The C4 has a format of 9×260, which has a convey capacity of 149.76 Mbps.

In addition, VC4-4c is consisted of VC having a single convey capacity in which four VC4s are included therein, and can convey C4-4c in which four C4s are included therein. This VC4-4c can be conveyed by STM4 having a format in which four STM1s are interleaved at a byte unit. In this case, as the STM4 can convey one VC4-4c, only one pointer among 12 pointers is used and the remaining 11 pointers are represented as CI.

Figure 1:
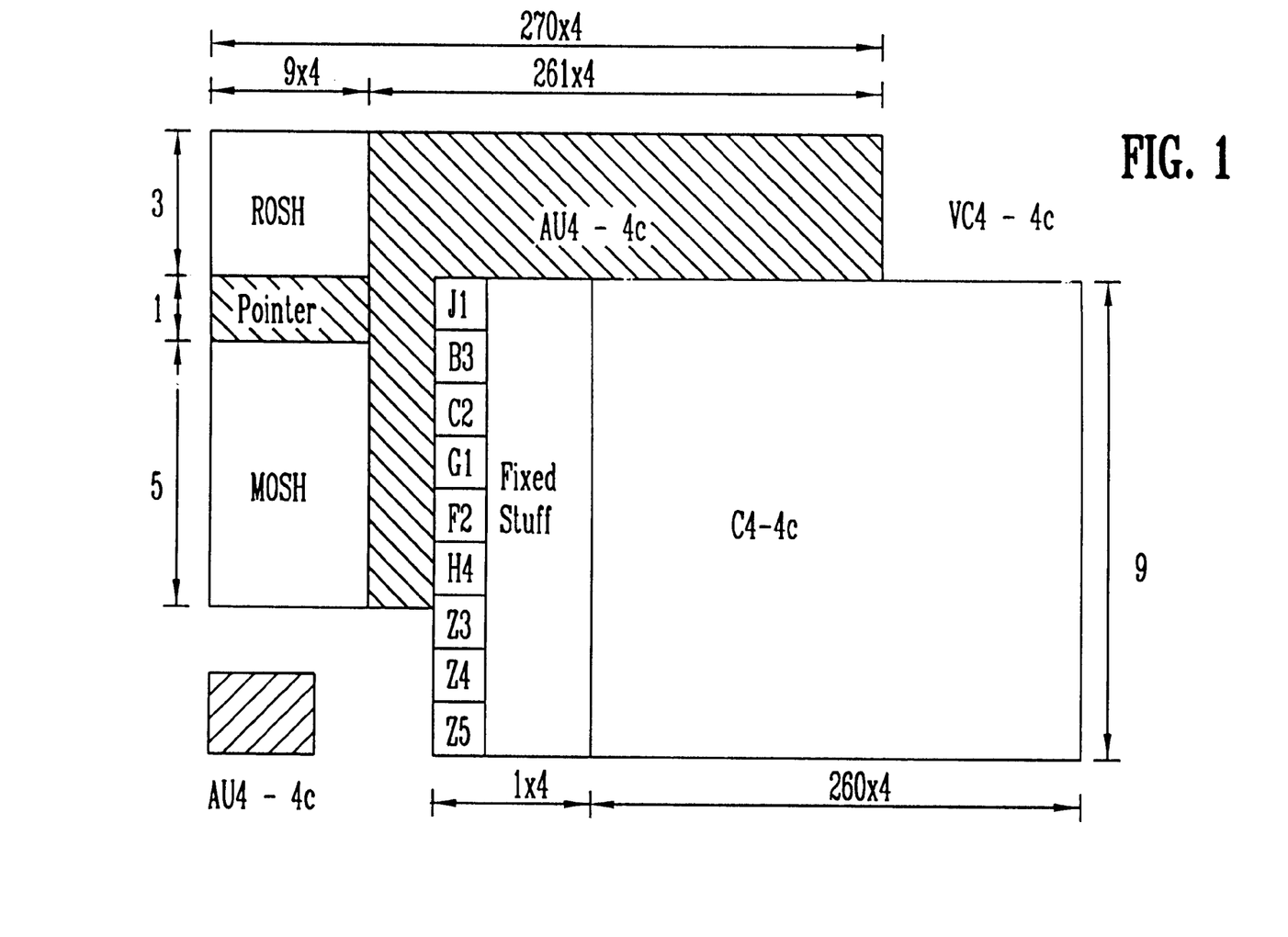
FIG. 1 is a schematic drawing to illustrate a synchronous transfer module(STM4-4c).

FIG. 1 is a schematic drawing to illustrate a synchronous transfer module(STM4-4c) and the operation thereof will explained as follows by reference to Table 1.

In Table 1 is shown a format of SOH and pointer when VC4-4cis conveyed onto STM4.

The sum of VC4-4c and pointers H1 and H2 indicating a beginning position of VC4-4c is called AU4-4c. When ATM cell is contained within the VC4-4c, a continuous flow of ATM cells is contained. As the beginning location of the ATM cells within a C4-4c is not fixed, the ATM cells may be positioned over the boundary of the VC4-4c. Any prior technologies relating to a method for implementing a ATM cell physical layer circuit for a Synchronous Optical Network (called "SONET" thereinafter)/STM are not known.

TABLE 1

| A1 | A1 | A1 | ... | A1 | A2 | A2 | A2 | ... | A2 | J0 | C1 | C1 | C1 | ... | |
|----|----|----|-----|----|----|----|----|-----|----|----|----|----|----|-----|---|
| B1 |    |    | ... |    | E1 |    |    | ... |    | F1 |    |    |    | ... | |
| D1 |    |    | ... |    | D2 |    |    | ... | 1* | D3 |    |    |    | ... | |
| H1 | Y  | Y  | ... | Y  | H2 | 1* | 1* | ... |    | 0  | 0  | 0  | 0  | 0 ... | 0 |
| B2 |    |    | ... |    |    |    |    | ... |    |    |    |    |    | ... | |
| D4 |    |    | ... |    | D5 |    |    | ... |    | D6 |    |    |    | ... | |
| D7 |    |    | ... |    | D8 |    |    | ... |    | D9 |    |    |    | ... | |
| D10|    |    | ... |    | D11|    |    | ... |    | D12|    |    |    | ... | |
| S1 |    |    | ... |    |    | M1 | ... |    |    |    |    |    |    | ... | |
| 12 COLUMN ||| | | 12 COLUMN ||| | | 12 COLUMN ||| | | |

When using an improper structure to implement this kind of 622 Mbps ATM cell physical layer circuit, there is a drawback that implementing the circuit is difficult since the circuit operating rate of many units is as high as 77.76 MHz and the hardwares become complicated. In addition, as most functions are performed in a frame unit in view of STM circuit, when implemented by a Very Large Scale Integrated Circuit ("VLSI") such as Application-Specific Integrated Circuit("ASIC") etc., lots of time is required to verify most functions in a simulation during a design. Also, when testing a chip after processing, there is a drawback that the operation may not be tested in a real-like situation because too many number of vectors (the number of clocks) are needed to test the real-like operation with a test vector.

SUMMARY OF THE INVENTION

Accordingly, the present invention is to implement ATM cell physical layer processing circuit which transmits and receives ATM cells with STM4-4c or STS-12c frame of 622 Mbps in accordance with I.432 standard of ITU-T and, more particularly, to provide a ATM cell physical layer processing circuit which provides a 16 bit UTOPIA (Universal Test & Operations PHY-Interface of ATM) interface of ATM Forum in its upper layer, for user's convenience, in which an ATM cell process is performed at a rate of 77.76 MHz in a byte unit and any other processes such as a STM process etc. are performed at a rate of 19M in four byte streams in parallel, thereby reducing the operating rate of the circuit and facilitating to implement it.

In addition, another object of the ATM cell physical layer processing circuit according to the present invention is to verify most functions with a times less test vectors(or the number of test vectors) by modifying timing generating circuits in each block and making the frame format to 9×30 not 9×270 in a specific test mode, so as to avoid too much time in testing a chip since most functions are performed in a frame unit in a STM-based ATM cell physical circuit of 155 Mbps or 622 Mbps. In other words, the present invention relates to a structure of general circuit having a 1:4 multiplex, demultiplex unit between a byte processing unit and a parallel processing unit and a real-time transformation between 16 bit UTOPIA format and a standard ATM cell format in a ATM cell processing unit, and also it relates to a structure of control circuit for driving the general circuit in 9×30 format.

In order to achive these objects described above, the present invention comprises a transmit ATM cell processing unit for reading cells from a transmit ATM cell FIFO and performing an idle cell insertion, HEC insertion and payload descrambling to form a C4-4c data; a receive ATM cell processing unit for performing a function to identify a cell boundary using HEC in the received C4-4c data, descramble payload, remove idle cells, and then write them into the receive ATM cell FIFO; a transmit path overhead processing unit to generate path overheads and insert them; a receive path overhead processing unit for performing a function to extract path overheads from the received VC4-4c data and process them; a transmit pointer processing unit for performing a function to generate pointer values indicating the position of the VC4-4c and insert them into the frames; a receive pointer processing unit for performing a function to extract pointer values from the received frame data, interpret them, and then detect the position of the VC4-4c; a transmit section overhead processing unit to generate section overheads and insert them; a receive section overhead processing unit for performing a function to extract section overheads from the received frame data and process them; a transmit/receive frame processing unit for enabling said transmit unit and said receive unit to process the frames; and a plurality of control unit controlling said transmit ATM cell processing unit, said receive ATM cell processing unit, said transmit path overhead processing unit, said receive path overhead processing unit, said transmit pointer processing unit, said receive pointer processing unit, said transmit section overhead processing unit, said receive section overhead processing unit, and said transmit/receive frame processing unit.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

Description of the Invention

The present invention will be described in detail by reference to the accompanying drawings.

Figure 2:
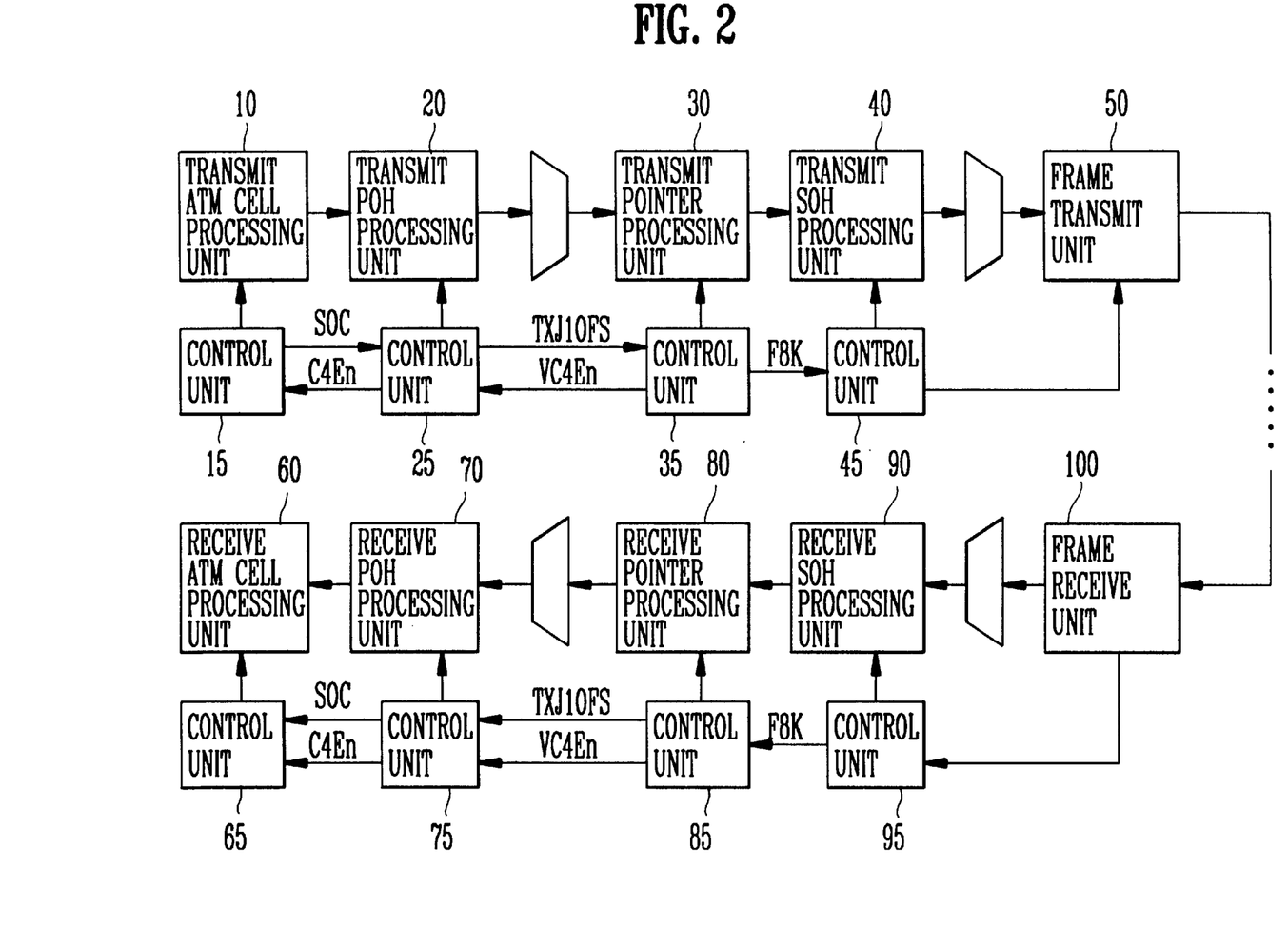
FIG. 2 illustrates a block diagram of ATM cell physical layer according to the present invention.

FIG. 2 illustrates a block diagram of ATM cell physical layer circuit according to the present invention and the operation thereof will be explained as follows. The physical layer circuit consists of ATM cell processing units 10 and 60 including a FIFO for ATM cell storage, POH processing units 20 and 70, pointer processing units 30 and 80, SOH processing units 40 and 90, and frame processing units 50 and 100 from the top.

The transmit unit 10 reads cells from a transmit ATM cell FIFO to form C4-4c data through an idle cell insertion, a HEC insertion and a payload scrambling. The receive unit 60 performs a function to write cells into a receive ATM cell FIFO by identifying a cell boundary using the HEC data in the received C4-4c data after descrambling a payload and eliminating an idle cell.

The transmit unit 20 in the POH processing units 20 and 70 generates and inserts POH (Path Overhead), and the receive unit 70 performs a function to extract and process the POH.

The transmit unit 30 in the pointer processing units 30 and 80 is responsible for generating pointer values indicating the position of VC4-4c and then inserting them. The receive unit 80 is responsible for detecting the position of VC4-4c by extracting and interpretate the pointer values.

The transmit unit 40 in the SOH processing units 40 and 90 is responsible for generating SOH (Section Overhead) and them inserting them, and the receive unit 90 is responsible for extracting the SOH and processing them. Here, an explanation will be given about each function block following a flow of ATM cell data.

The ATM cell processing units 10 and 60 are enabled to drive by a C4-4c interval signal from each of the POH processing units 20 and 70. Though the transmit ATM cell FIFO (not shown) within the ATM cell processing units 10 and 60 is consisted of one four cell FIFOs, an external ATM cell processing circuit is made to write ATM cell to be sent via the UTOPIA interface into the FIFO. The control circuit in the transmit FIFO enables the ATM cells to be written into the four FIFOs in sequence by generating a FIFO select signal and a write address for selecting one of four FIFOs synchronous with UTOPIA interface, and manages a flag informing whether the cells are stored in each FIFO or not. Also, it inhibits the transmit FIFO to overflow using a signal, txfull. Additionally, in order to form a continuous flow of cells at C4-4c intervals, when there are cells to be sent to more than one FIFOs while monitoring the FIFO flag, the control circuit sends the cell data to the ATM cell processing unit by increasing a read address with selection of corresponding FIFO and informs that an idle cell must be inserted by asserting the signal called idle_con during one cell time if there is no any cell to send. Also, it activates the operation of the ATM cell processing unit by sending a Start Of Cell (called "SOC" thereinafter) indicating the start of ATM cell along with a cell data and idle_con signal. Next, the timing signal of the ATM cell processing unit is generated in synchronous with the SOC. The ATM cell processing unit inserts an idle cell into the position into which an idle cell is to be inserted, inserts all the cells by calculating HEC for them, and performs a scrambling for a cell payload. In addition, the ATM cell processing unit sends a SOC signal indicating a start position of the ATM cell to the POH processing unit so as to help H4 values generate from the POH processing unit.

The transmit POH processing unit 20 is enabled to operate only during intervals of VC4-4c by the VC4EN signal received from the transmit pointer processing unit 30 to generate the signal indicating the interval of C4-4c on the VC4-4c to be sent, and then sends the signal to the ATM cell processing unit so as to enable it. The transmit processing unit 20 is responsible for generating a POH to insert it into a corresponding position of the VC4-4c and for forming the VC4-4c along with the data of the C4-4c which are a flow of continued ATM cells sent from the ATM cell processing unit. Each POH is generated using the VC4-4c data transmitted immediately before and the state of the receive POH processing unit 70, or the received value from the external serial interface for inserting an overhead. The VC4-4c generated thus is sent to the pointer processing unit during the intervals of VC4-4c along with TXJ1OFS indicating the start position of VC4-4c. The POH which is generated and inserted from the POH processing unit are J1, B3, C2, G1, F2, H4, Z3, Z4 and Z5. The VC4-4c data formed thus are divided into four STM1 streams so that they are to be sent to the pointer processing unit, and the TXJ1OFS signal is synchronized to the divided data.

The transmit pointer processing unit operates as a master of the entire units, which sends a frame synchronous signal to the SOH processing unit to designate the start position of the frame and sends a VC4-4c interval signal to the POH processing unit to enable it. At this time, it may also send a additional synchronous signal instructing the start position of the VC4-4c to the POH processing unit so as to initialize the timing of the POH processing unit and designate the start position of the VC4-4c in a transmit frame. The pointer processing unit generates a pointer value based on the TXJ1OFS signal indicating the start position of the VC4-4c which is transmitted from the POH processing unit and then inserts it into pointer positions H1 and H2 of the frame while passing the data of the VC4-4c to the SOH processing unit. Accordingly, the pointer processing unit functions to generate AU4-4c. As a result, as the SOH processing unit, the pointer processing unit and the ATM cell processing unit all use same clocks(19.44 MHz clocks are also generated by dividing 77.76 MHz) in the transmit processing unit, the variations in the pointer values are not caused.

The SOH processing unit generates periodically frames in time with the frame synchronous signal sent from the pointer processing unit, and the pointer processing unit transmits the frames with the AU4-4c data (VC4-4c data and corresponding pointer values) sent therefrom conveying on them and then generates various SOHs to insert them into corresponding positions. As the AU4-4c data being sent from the pointer processing unit is synchronized with the frame timing in the SOH processing unit, an additional buffer is not required. The SOH in the STM frame which is generated using the frame data sent immediately before, the state of the receive SOH processing unit and the value obtained from the external serial interface, and the overhead bytes which is generated and inserted from the SOH processing unit are J0(C1), B1, E1, F1, D1, B2, K1, K2, D2, S1, M1 and E2. The four parallel data streams generated processed are again multiplexed into one 77M stream before they are sent to the transmit framer. The value of the B1 is calculated at its multiplexed state and then inserted before being multiplexed. The transmit framer inserts A1, A2 framing bytes of the transmit frame and then descrambles the entire data in synchronous with the frames.

The receive unit finds frame patterns A1 and A2 from a flow of continued frames to which a frame receive unit is received to detect the start position of the STM frame and then synchronizes the timing of the correspondingly received SOH processing unit. After the received frame data are descrambled with a frame sync, they are divided into a parallel data of four STM1s of 19 MHz and then sent to the SOH processing unit, from this point the timing signal from one timing controller is commonly applied for 19M streams to process them as same with the transmit unit. For the STM4-4c, B2 byte is calculated for each four streams so that it is compared with them and M1 byte is extracted from the third stream. As most of the overheads are positioned at the first stream, the timing signal is applied for only the streams corresponding to the timing signal. The SOH processing unit extracts various overheads of the received STM frames in response to the timing to process them, and some SOHs are output via an external serial interface. The frame data thus processed are sent to the receive pointer processing unit so as to process a pointer process, and simultaneously synchronize the timing of the pointer processing unit by conveying the start position signal of the frame along with the received data. In the SOH processing unit are processed information such as J0 (C1), B1, E1, F1, D1, B2, K1, K2, D2, S1, M1 and M2, as same with the receive unit.

The receive pointer processing unit 70 synchronizes the internal timing generating unit in response to the sync signal sent from the STM processing unit to generate various timing signals necessary for a pointer process. The pointer processing unit extracts the pointers from the received STM frame data and then processes them to find the start position of VC4-4c, and send a VC4EN signal indicating the VC4-4c interval and a RXJ1OFS signal of the start position signal of the VC4-4c to the POH processing unit along with the received frame data. What the pointer processing unit can process increase (I bits inverse), decrease (D bits inverse), reception of new pointer (NDF setting) and normal reception of three continued pointers. As a result of processing each pointer, the pointer processing unit regulates the VC4EN signal and the RXJ1OFS signal to send them to the POH processing unit.

Streams of four parallel data are sent to the POH processing unit and multiplexed again to form a 77M stream, and accordingly the VC4EN signal and the RXJ1OFS signal are regulated again. The receive POH processing unit is enabled to operate only at VC4-4c intervals by the VC4EN signal sent from the pointer processing unit, synchronizes the timing by means of the RXJ1OFS signal of the start position signal of the VC4-4c, and, in response to the timing signal, it extracts various POHs to process them. Also, the ATM cell processing unit sends the C4EN signal, the interval signal of C4-4c to the receive ATM cell processing unit at the received VC4-4c interval along with the data of the portion corresponding to the C4-4c. Then, it also sends the start point information of the cell obtained by H4 of the POH therewith to the ATM cell processing unit to confirm whether the results of the cell boundary identification using the HEC at the cell processing unit coincide with it. The overheads which the receive POH processing unit processes are J1, B3, C2, G1, F2, H4, Z3, Z4 and Z5.

The receive ATM cell processing unit 60 is enabled by the C4EN signal sent by the receive POH processing unit 70 to operate at the C4-4c interval, and performs the cell boundary identification using the HEC to find the boundary of the cell at the C4-4c stream. During this process, it can correct 1 bit HEC error and detect errors more than 2 bits. If the cell boundary is found, the receive ATM cell processing unit descrambles the payload, checks the header and selectively discards it if it is an idle cell. The flow of thus obtained ATM cell is sent to the receive ATM cell FIFO along with the write_enable signal indicating whether it should be stored into the receive FIFO or not. In the receive ATM cell FIFO are four FIFOs, and, when the four FIFOs are write_enabled, they select empty FIFOs sequentially and then increases a write address to store ATM cells into corresponding FIFOs. When the ATM cells are received at more than one FIFO, the FIFO informs a higher ATM cell processing unit this fact through a rxempty signal of the UTOPIA interface to read the ATM cell. In the present invention, the ATM cell processing unit is operated at 77.62 MHz to decrease the operating rate of the circuit, and most of the POH processing unit, the pointer processing unit, the SOH processing unit are made to operate at 19.44 MHz except for B3 calculation, B1 process, frame (de)scrambling, frame receive function etc. which may not be processed in a byte unit at some of the 77.76 MHz. The signals used to synchronize among each of the blocks are synchronized to 19.44 MHz clock. Also in multiplexing and demultiplexing between the POP processing unit and the pointer processing unit and between the SOH processing and the frame transmitter and receiver, a deco which indicates the position of each column for the clock of 77M is used to identify the phase of each column data, as shown in FIG.3. Accordingly, there exist 77.76 MHz and 19.44 MHz clocks at the transmitter and the receiver, respectively. The 19.44 MHz clock is generated by dividing the 77.76 MHz clock, where the rising edges of two clocks are regulated to coincide with each other. In practice, considering a skew between the two clocks while guaranteing such phase relationship, an additional negative edge flip/flop circuit or latch circuit is employed so that the data and the control signal are transmitted safely. In the present invention, as the major sync signals between each block and the timing signal within each block are generated based the STM1 having a structure of 9×270, they are sent on a 19 MHz clock basis even when the data are sent being divided into four streams, and the control signal for sync thereof is regulated by the latency time due to the conversion between the 19M stream and the 77M stream.

Figure 3A:
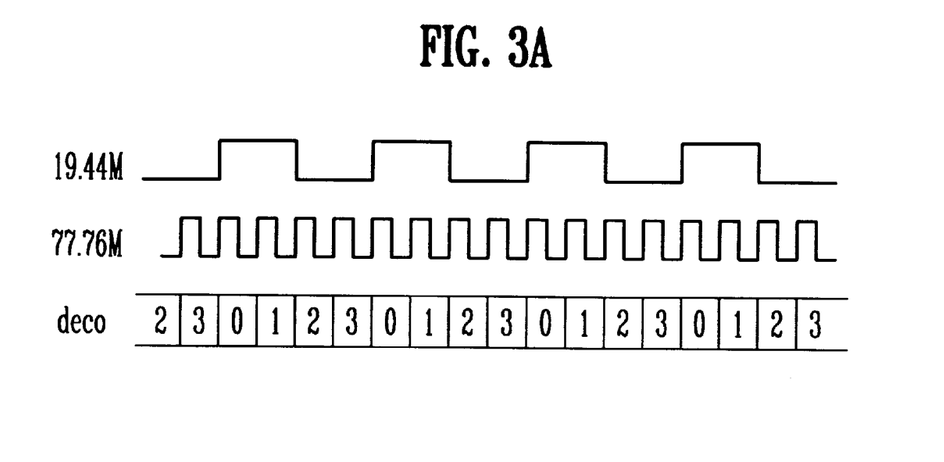
FIG. 3A and FIG. 3B are schematic drawings to the relationship between the clock and the data during multiplex and demultiplex at a transmitter and a receiver.
Figure 3B:
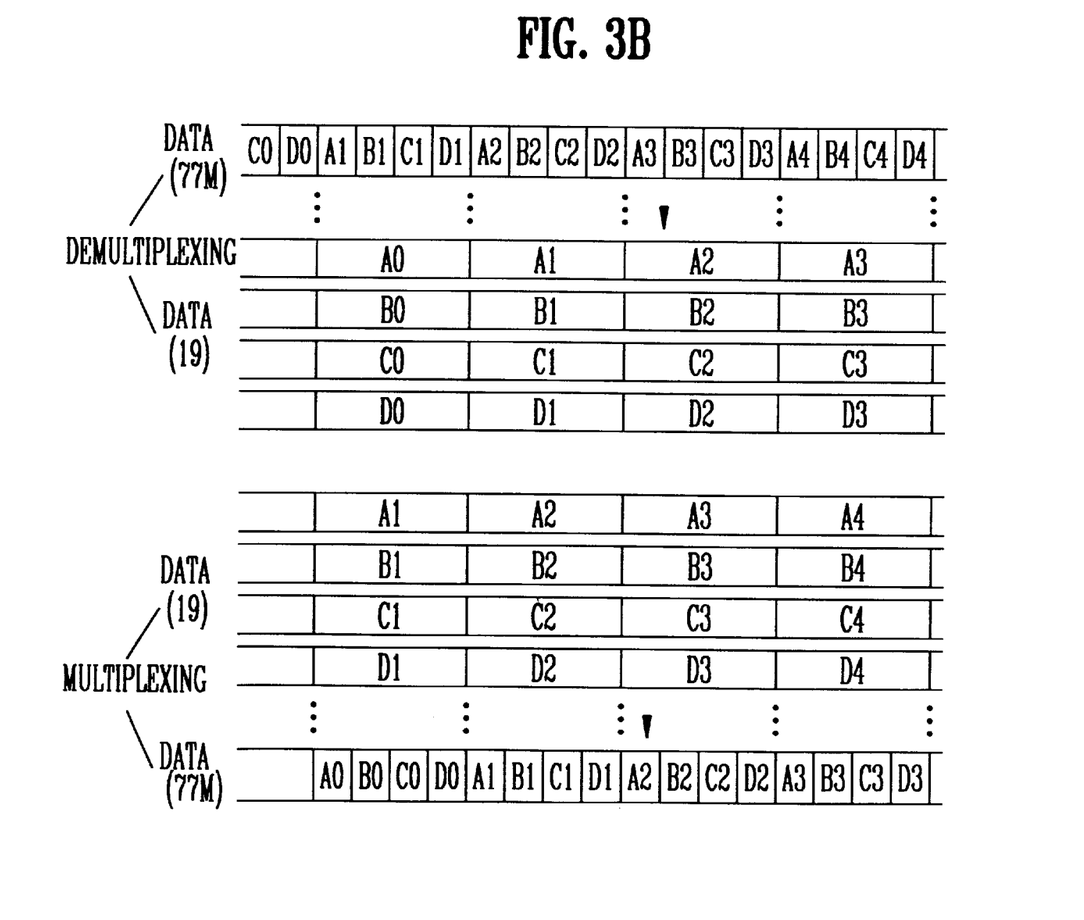

FIG. 3A and FIG. 3B show the relationship between the clock and the data during operation of multiplexing and demultiplexing at the transmit unit and the receive unit.

In the present, as the cells are received and sent in a 16 bit UTOPIA format with a circuit responsible for a higher ATM function, a 27×6 bit is a basic unit at the internal FIFO. In reality, however, when the C4-4c cell is contained into the cell, the ATM cell of 53 bytes not 54 bytes must be positioned in a row, the transmit unit is required to have a function of eliminating UDF (user defined function) in the 16 bit UTOPIA format and also the receive unit is required to have a function of inserting the UDF. In FIG. 3B is shown the 16 bit UTOPIA format.

Figure 4A:
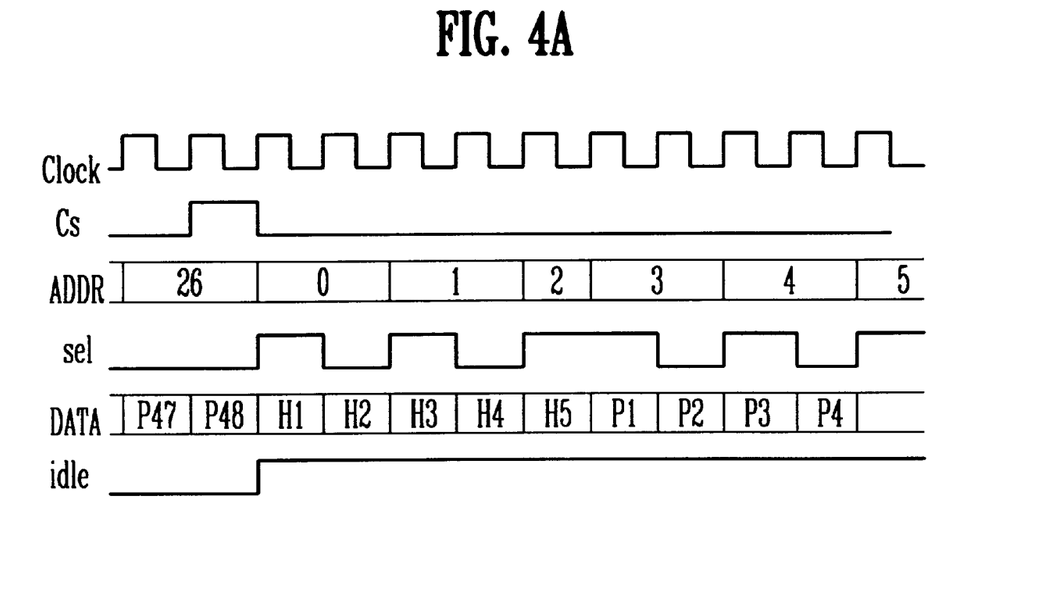
FIG. 4A illustrates a timing of 16 bit→8 bit transform in the transmitter.

The transmit ATM cell processing unit is given to provide the Cell Start("CS") signal having a cycle of 53 clocks for the ATM cell FIFO. The transmit FIFO 43 sees four flag values from the start point of the CS to determine whether there exist more than one cell in the FIFO or not, and If exist, it selects a corresponding FIFO to increase a read address. Due to increase of this address, the corresponding data of the cell are sent to the cell processing unit in a row. If there is no cell in the transmit FIFO 43, it asserts an idle_con signal indicating that an idle cell must be inserted therein.

However, as the data of the FIFO have a 16 bit UTOPIA format, as shown in Table 2, it requires a function to delete the UDF incoming together with the HEC and then convert it into a standard cell format.

In order to create the data of standard ATM cell data stream from the 16 bit UTOPIA formated FIFO data, the read address is incremented once per two clocks except for the third word and higher and lower bytes are selected in sequence. But for the third word containing HEC and UDF, the read address is incremented in one clock and only the higher byte (HEC) is selected skipping the UDF byte without interrupting the continous standard cell stream, as shown in FIG. 4A.

TABLE 2

A format of 16 bit UTOPIA

Figure 4B:
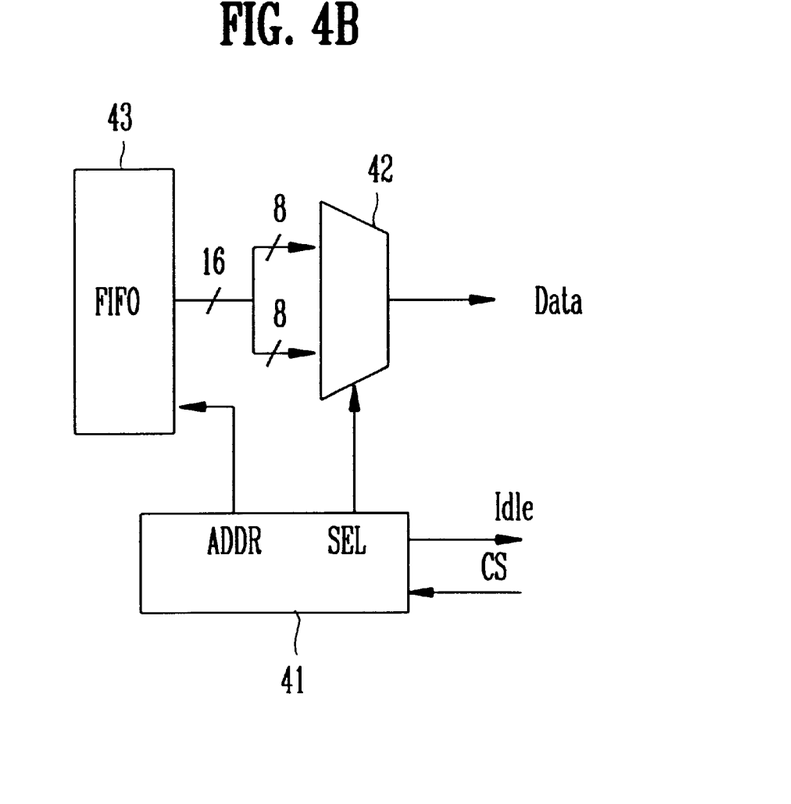
FIG. 4B illustrates a block diagram of 16 bit→8 bit transformer in the transmitter.

| Header 1 | Header 2 |
| Header 3 | Header 4 |
| HEC | UDF |
| Payload 1 | Payload 2 |
| : | : |
| : | : |
| : | : |
| Payload 47 | Payload 48 | the CS signal in FIG. 4B represents the start position and is used to load the read address counter 41 with 0. To do the address and select signal generation, a simple statemachine is used to create an increase condition of the counter and higher/lower select signals of the data MUX 42 read with 27 counter indicating a read address loaded therein. Also in case that the cells are transmitted continuously, the read address must be ready to begin from 0 immediately.

Figure 5A:
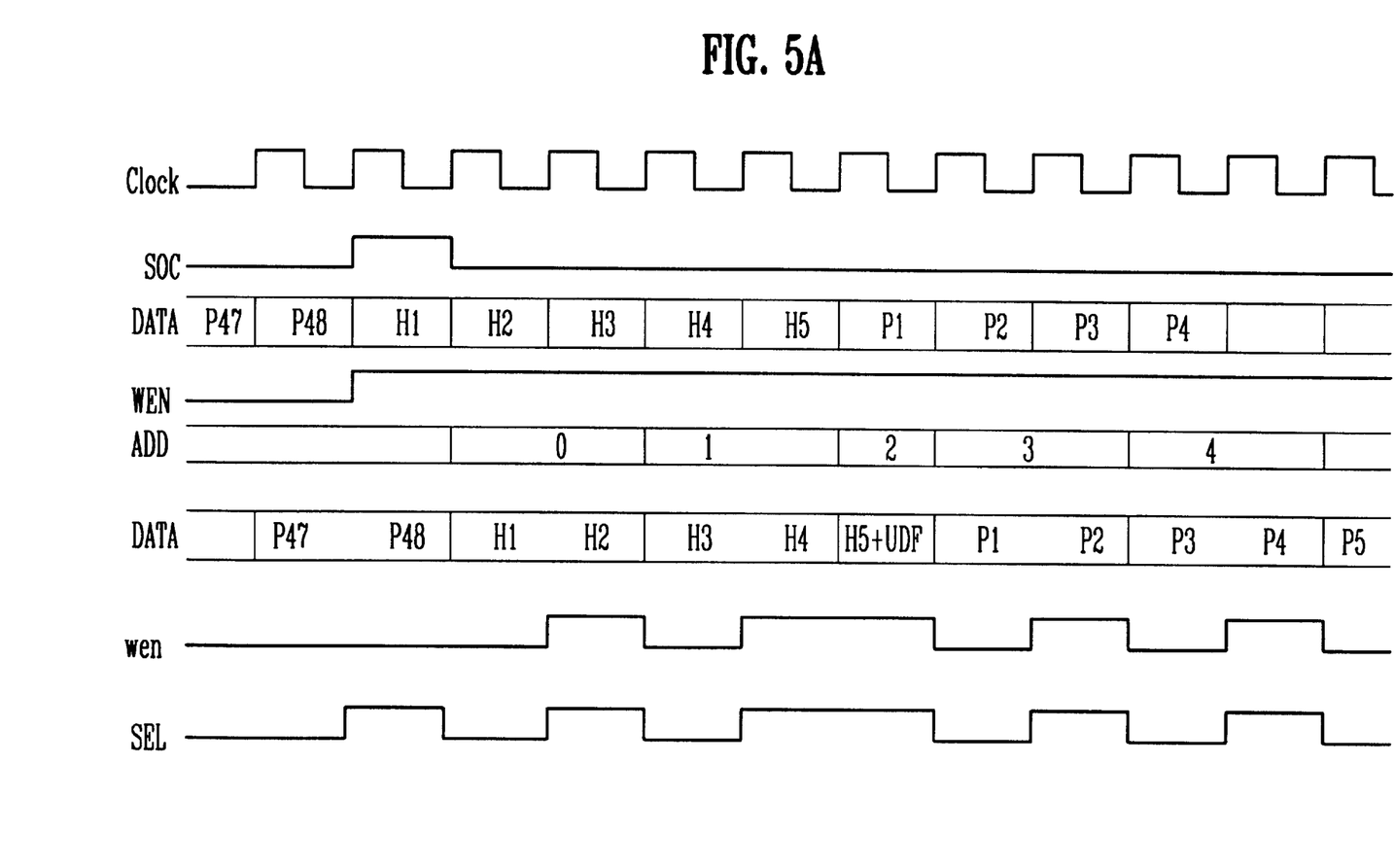
FIG. 5A illustrates a timing of 16 bit→8 bit transform in the receiver.
Figure 5B:
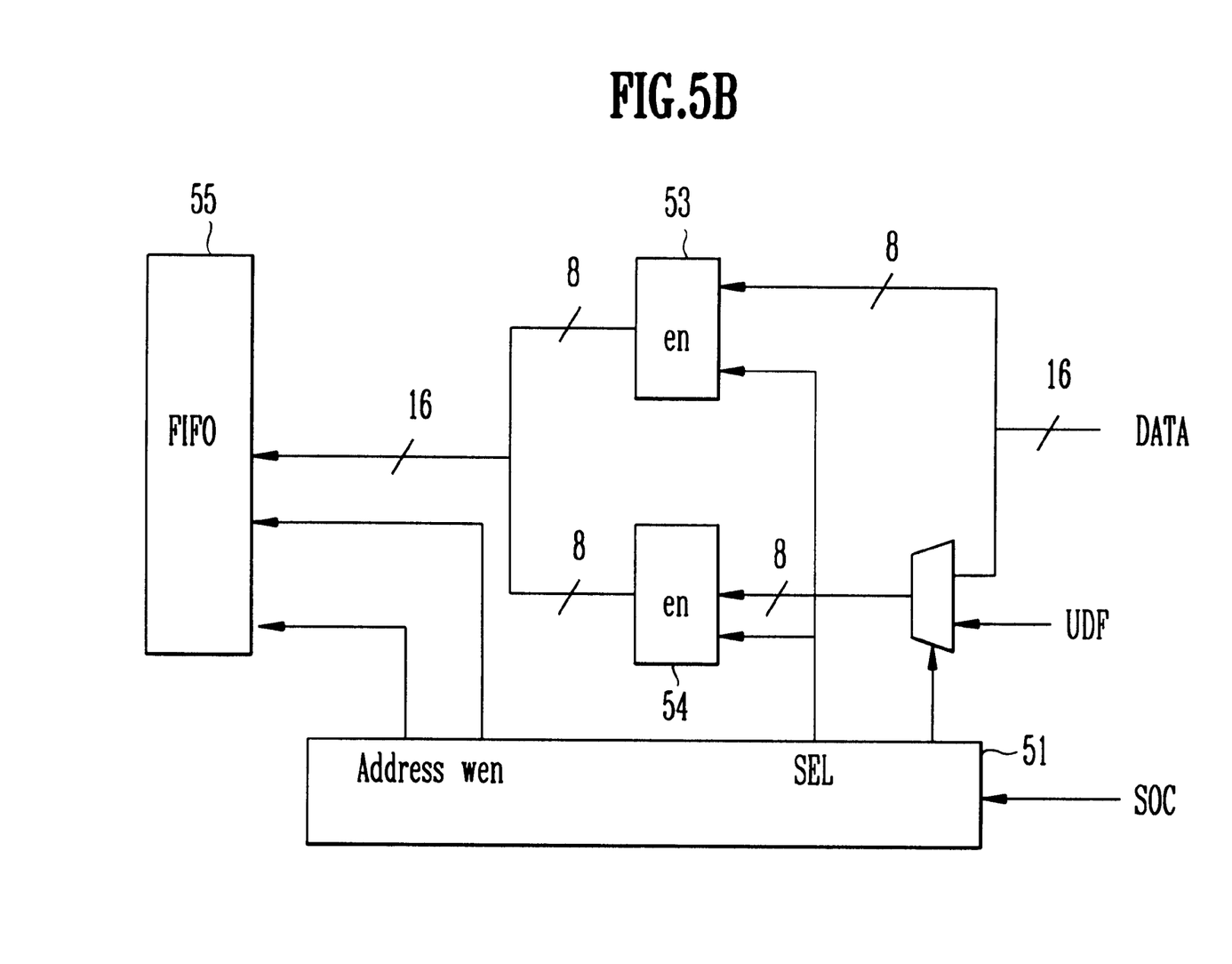
FIG. 5B illustrates a block diagram of 16 bit→8 bit transformer in the receiver.

The receive ATM cell processing unit sends the write enable signal and the SOC signal to the receive FIFO 55 along with the received cell data when the cell to be written into the FIFO is ready, and requires a function to convert a flow of the standard ATM cells into a 16 bit UROPIA format to write them into the FIFO since the receive FIFO 55 has 16 bit UTOPIA format. This enables incoming 8 bit data to be latched into the higher latch 53 and the lower latch 54 with two latches being loaded therein so as to create a word of 16 bits, and the UDF data to be written into the lower latch 54 simultaneously when the HEC is latched into a higher latch. After the 16 bit data to be written into the FIFO are created thus, the receive ATM cell processing unit enables it to be written into the FIFO with a write enable signal along with a write address and a read address. For this purpose, the receive ATM cell processing unit loads the 27 address counter 51 with 0 using the SOC and increase the counter with appropriate latch enable signals. And to this end, it uses a simple statemachine to create higher/lower select signals for latching words an increase condition of the counter.

Figure 6:
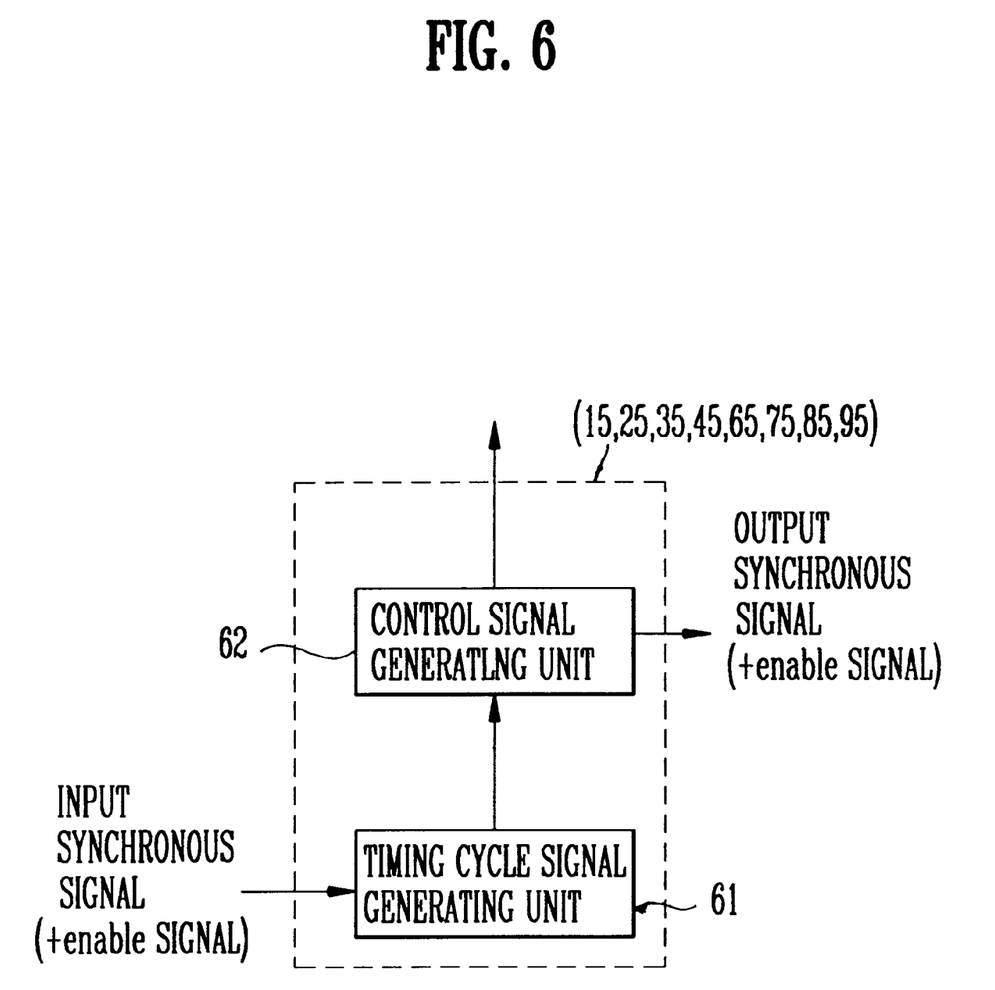
FIG. 6 illustrates a structure of control unit in each block.

Each of the control unit 15, 25, 35, 45, 65, 75, 85 and 95 in FIG. 2 has a basic unit of 9×270 as explained earlier, and the basic structure is divided into a timing cycle signal generating unit 61 for generating timing pulses that are necessary periodically and a control signal generating unit 62 for making various control signals (for example, an overhead select signal and B2 register clear signal etc.) that are necessary actually using the timing cycles. However, as this kind of STM processing circuit perform most function in a frame base (for example, in-frame condition is declared when two consecutive frame pattern is found and MS-AIS is declared when bits 6, 7 and 8 of K2 are found to be at "p111"

state for three consecutive frames). In order to confirm most functions, a 9×270 clock per frame is needed when it is STM1, and a 9×270×4 clock per frame is needed when it is STM4 as in the present invention. Accordingly, if the timing generating circuit in the entire blocks is modified and operated in a frame type of reduced 9×30 format not in 9×270 format at a specific test mode, a simulation time during development can be reduced as well as the chip test time can be reduced. For the this purpose, each timing cycle generating circuit is made to incorporate a mode of a frame pattern of 9×30. By doing this, the time necessary is reduced by 9 times because it is possible to confirm the function with 9 times less number of clocks(test vectors).

To do this, the timing generator 61 in each block should have a structure that is capable of counting with a 9 times reduced type at a specific mode.

Figure 7:
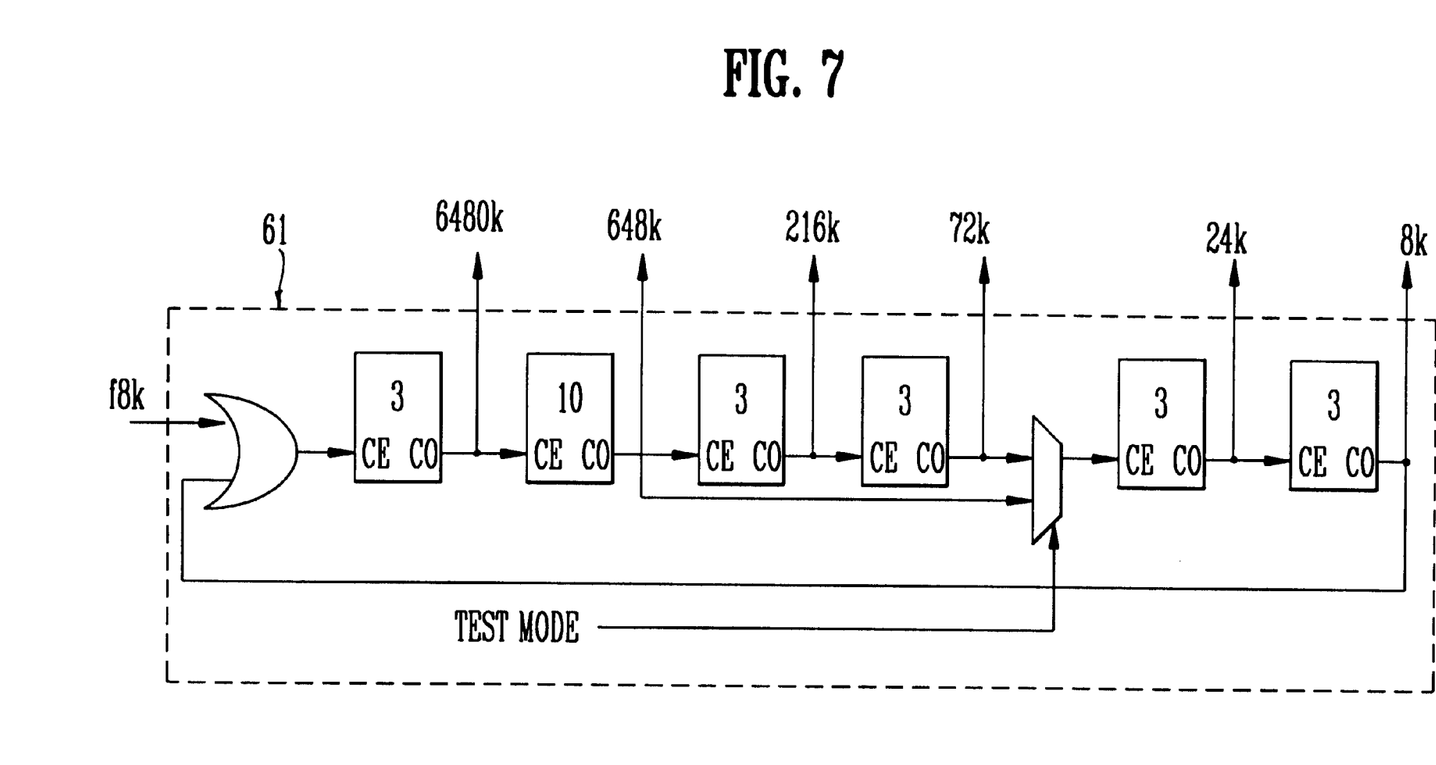
FIG. 7 illustrates a block diagram of timing generating unit in SOH processing unit which is one embodiment to explain a timing generating unit of each block at 9×30 test mode.

FIG. 7 shows a block diagram of the SOH processing unit which is illustrated to explain the timing generating unit in each block at a 9×30 test mode, and the structure of the timing generating unit of the control circuit thereof for each block will be explained herein.

First, the timing generating unit 61 in the SOH processing unit will be explained.

FIG. 7 show a counter structure in the SOH processing unit in which the counters are formed in 3×10×3×3×3×3 type to create each timing signal necessary for STM process. In the stage in each counter, there is fixed a proper value with a load data so that it can count at a desired cycle, A self stage is loaded therein by Carry Out("CO") of each stage, and also a following stage is increased by 1 to create a desired type of pulse only when a preceding stage arrives at its last value because the CO of the preceding stage is used as a CE of the following stage. This circuit creates signals of 8 k, 24 k, 72 k, 216 k and 648 k, in which 8 k indicates the start point of the frame, 24 k indicates the start point of every 3 row, 72 k indicates the start point of all rows, 216 k indicates the tri-sect of all the rows and 648 k indicates the time point when all rows are divided by one ninth. The control generating unit 62 of the SOH processing unit generates the timing signal necessary to process various overheads using these signals. In the present invention, an interim 3×3 portion is bypassed so that this timing generating circuit is driven 9 times faster at 9×30 test mode. By doing this, 8 k signals are generated a times as frequently (in reality, 8 k becomes 72 k) and 72 k signals are generated a times as frequently. In addition, as the signal that divides the STM1 into three columns is generated without interruption, the signals that are created at the control signal generating unit 62 using 8 k and 72 k signals are generated as frequently as 9 times as though they are generated in normal mode.

The pointer processing unit has a structure of 3×10×9×9 to generate 8 k and 72 k signals because it does not need a timing signal necessary for a serial input and output unlike the SOH processing unit, which generates a timing signal (a pointer position and a column separation signal) necessary for processing a pointer. Also a control signal may be obtained therefrom which is modified to the frame of a reduced 9×30 type by bypassing an interim 9 counters in 9×30 test mode. In the same manner, though the POH processing unit is made to count from 1 to 2349(9×261= 2349), as the structure of the VC4 becomes 9×21 at this test mode, it should count from 1 to 189 even though the information of the start position of each row corresponding the position of the POH is made to decode 1, 262, 523, . . . , and it should decode 1, 22, 43, . . . , when decoding the start of the row. Also, as the frame processing unit should only know the next start point of the frame to compare a continued frame pattern, it makes the cycle 9×30×4 at the test mode though it has a counter that can count up to 9×270×4=1080. As the ATM cell processing unit has a 53 counters to generate a timing signal, it is not changed because only the C4EN signal arriving at the ATM cell processing unit changes.

Figure 8:
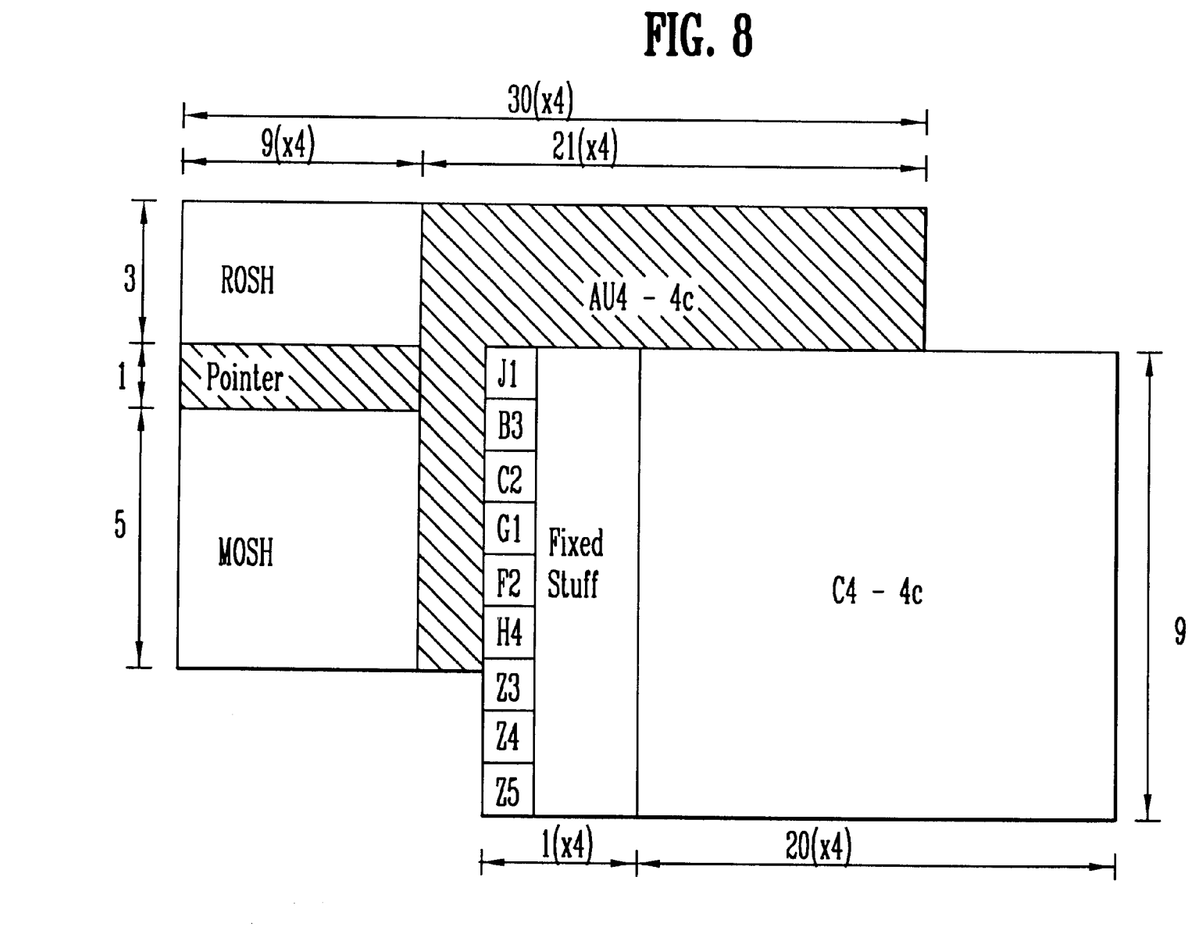
FIG. 8 illustrates a schematic drawing for showing a frame format at 9×30 test mode.

As such, if it is made to omit the 9 count units from the timing unit of a core unit in each block, and if the control signal generating unit 62 in each block generates a necessary control signal only by the signal sent from the timing generating unit 61, the entire circuits can operate at 9×30 mode while maintaining the relationship among blocks. The shape of the frame in the 9×30 mode is same as FIG. 8 and the overhead thereof do not change.

The present invention relates to a ATM cell physical layer processing circuit that transmits and receives ATM cells with STM4-4c or STS-I2c frames of 622 Mbps in accordance with I.432 of ITU-T standard, in which, for user's convenience, 16 bit UTOPIA interface of ATM Forum is provided at its higher layer, ATM cell processing is done at 77.76 MHz rate in byte unit, and the remaining processes such as a STM process etc. are parallel executed at 19M rate in four byte streams, thereby reducing the operating rate of the circuit and facilitating to implement it.

In addition, the present invention can verify most functions within a times short time(or the number of test vectors) by modifying a timing generating circuit in each block and making the frame format to 9×30 not 9×270 in a specific test mode, so as to avoid too much time in testing a chip because most functions are performed in a frame unit in a STM-based ATM cell physical circuit of 155 Mbps or 622 Mbps.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What we claim:

1. An STM-based ATM cell physical layer processing circuit, comprising:

a transmit ATM cell processing unit for reading an ATM cell from a transmit ATM cell FIFO and inserting an idle cell, inserting a header error control (HEC), and scrambling a payload of said ATM cell to form a C4-4c data;

a receive ATM cell processing unit for identifying a cell boundary using said HEC in said received C4-4c data, descrambling said payload, removing said idle cell, and writing a resulting ATM cell into a receive ATM cell FIFO;

a transmit path overhead processing unit for generating path overheads and inserting said path overheads into said C4-4c data to form VC4-4c data;

a receive path overhead processing unit for extracting path overheads from said received VC4-4c data and processing said path overheads;

a transmit pointer processing unit for generating pointer values indicating a position of said VC4-4c data in a frame data structure and inserting said pointer values into said frame data structure;

a receive pointer processing unit for extracting said pointer values from a received frame data structure, interpreting said pointer values, and detecting said position of said VC4-4c data;

a transmit section overhead processing unit for generating section overheads and inserting said section overheads in said frame data structure;

a receive section overhead processing unit for extracting section overheads from said received frame data structure and processing said section overheads;

a transmit/receive frame processing unit for enabling a transmit unit and a receive unit to process said frame data structure; and a controller comprising a plurality of control units for controlling said transmit ATM cell processing unit, said receiver ATM cell processing unit, said transmit path overhead processing unit, said receive path overhead processing unit, said transmit pointer processing unit, said receive pointer processing unit, said transmit section overhead processing unit, said receive section overhead processing unit, and said transmit/receive frame processing unit.

2. The STM-based ATM cell physical layer processing circuit as claimed in claim 1, wherein: said transmit ATM cell processing unit converts a 16 bit UTOPIA format data into 8 bit ATM cell data by increasing a read address from the start point of the cell once per two clocks, selecting a higher byte and a lower byte of data from one address in a row, increasing said read address in one clock only when said address contains said HEC, and selecting only said higher byte when said address contains said HEC to omit a UDF byte of said 16 bit UTOPIA format.

3. The STM-based ATM cell physical layer processing circuit as claimed in claim 1, wherein said receive ATM cell processing unit comprises:

a basic structure of an internal FIFO being 27×16bits;

a 16 bit UTOPIA interface as an interface with ATM layer; and said receive ATM cell processing unit controlling the select signals of higher and lower latches and the write address of said internal FIFO in response to a received byte stream to convert said received byte stream into said 16 bit UTOPIA format, and storing said received byte stream in the UTOPIA format into said internal FIFOs.

4. The STM-based ATM cell physical layer processing circuit as claimed in claim 1, wherein said transmit and receive path overhead processing unit transmits a clock enable signal to said transmit and receive ATM cell processing unit.

5. The STM-based ATM cell physical layer processing circuit as claimed in claim 1, wherein said transmit and receive pointer processing unit transmits a clock enable signal to said transmit and receive path overhead processing unit.

6. The STM-based ATM cell physical layer processing circuit as claimed in claim 1, wherein each one of said plurality of control units includes a timing cycle signal generating unit for generating necessary timing pulses periodically and a control signal generating unit for transmitting actual necessary control signals in response to said timing pulses.

7. The STM-based ATM cell physical layer processing circuit as claimed in claim 6, wherein said timing cycle signal generating unit has a basic 9×270 format and an extra 9×30 format test mode.

8. The STM-based ATM cell physical layer processing circuit as claimed in claim 6, wherein said timing cycle signal generating unit is constructed such that said timing generating unit in the section overhead processing unit includes a 3×10×3×3×3×3 format, said timing generating unit in said pointer processing unit includes a 3×10×9×9 format, and said timing generating unit in said path overhead processing unit includes a 9×270 format.

9. An STM-based ATM cell physical layer processing circuit, comprising:

a transmit ATM cell processing unit for reading an ATM cell from a transmit ATM cell FIFO and inserting an idle cell, inserting a header error control (HEC), and scrambling a payload of said ATM cell to form a C4-4c data;

a transmit path overhead processing unit for generating path overheads and inserting said path overheads into said C4-4c data to form a VC4-4c data;

a transmit path pointer processing unit for generating pointer values which indicate a position of said VC4-4c data in a frame data structure and inserting said pointer values into said frame data structure;

a transmit path section overhead processing unit for generating section overheads and inserting said section overheads in said frame data structure;

a transmit path frame processing unit for transmitting said frame data structure to a transmission line;

a receive path frame processing unit for receiving a received frame data structure from said transmission line;

a receive path section overhead processing unit for extracting said section overheads from said received frame data structure and processing said section overheads;

a receive path pointer processing unit for extracting said pointer values from said received frame data structure, interpreting said pointer values, and detecting a position of VC4-4c data in said received frame data structure;

a receive path overhead processing unit for extracting said path overheads from said received VC4-4c data to form a received C4-4c data, and processing said path overheads;

a receive ATM cell processing unit for identifying a cell boundary using said HEC in said received C4-4c data, descrambling said payload and removing said idle cell from said received C4-4c data, and writing a resulting received ATM cell into a receive ATM cell FIFO; and a controller comprising a plurality of control units for controlling said transmit ATM cell processing unit, said transmit path overhead processing unit, said transmit path pointer processing unit, said transmit path section overhead processing unit, said transmit path frame processing unit, said receive path section overhead processing unit, said receive path pointer processing unit, said receive path overhead processing unit, and said receive ATM cell processing unit.

* * * * *